United States Patent
Takeo

(10) Patent No.: US 7,123,773 B2
(45) Date of Patent: Oct. 17, 2006

(54) IMAGE CODING-DECODING METHOD, IMAGE CODING-DECODING SYSTEM, IMAGE CODER, IMAGE DECODER, AND STORAGE MEDIUM

(75) Inventor: Hideya Takeo, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 610 days.

(21) Appl. No.: 09/778,908

(22) Filed: Feb. 8, 2001

(65) Prior Publication Data
US 2001/0019335 A1    Sep. 6, 2001

(30) Foreign Application Priority Data
Feb. 9, 2000    (JP)    ............... 2000-031624

(51) Int. Cl.
G06K 9/36    (2006.01)

(52) U.S. Cl. ............... 382/240; 382/232; 382/233; 382/248

(58) Field of Classification Search ............... 382/248, 382/249, 240, 236, 166, 233, 232, 242; 375/240.02, 375/240.19, 240.08; 713/180, 200, 201
See application file for complete search history.

(56) References Cited

U.S. PATENT DOCUMENTS

| | | | | |
|---|---|---|---|---|
| 4,258,264 A | | 3/1981 | Kotera et al. ............... | 250/484 |
| 4,276,473 A | | 6/1981 | Kato et al. ............... | 250/327.1 |
| 4,315,318 A | | 2/1982 | Kato et al. ............... | 364/515 |
| 5,325,449 A | * | 6/1994 | Burt et al. ............... | 382/240 |
| 5,461,655 A | * | 10/1995 | Vuylsteke et al. ............ | 378/62 |
| 5,799,100 A | * | 8/1998 | Clarke et al. ............... | 382/132 |
| 5,946,417 A | * | 8/1999 | Bonneau et al. ............ | 382/236 |
| 6,002,794 A | * | 12/1999 | Bonneau et al. ............ | 382/166 |
| 6,075,878 A | * | 6/2000 | Yoshida et al. ............. | 382/132 |
| 6,075,905 A | * | 6/2000 | Herman et al. ............. | 382/284 |
| 6,141,445 A | * | 10/2000 | Castelli et al. .............. | 382/232 |

FOREIGN PATENT DOCUMENTS

JP    55-12429    1/1980

(Continued)

OTHER PUBLICATIONS

Patent Abstract of Japan 56-164645.

(Continued)

*Primary Examiner*—Anh Hong Do
(74) *Attorney, Agent, or Firm*—Sughrue Mion, PLLC

(57) ABSTRACT

A multiresolution coding section includes a wavelet transformation section for performing a wavelet transformation process on an image signal to obtain coefficient signals, a coefficient transformation section for performing a coefficient transformation process, which corresponds to image processing, on the coefficient signals to obtain processed coefficient signals, and a coding section for performing a coding process on the processed coefficient signals to obtain processed coded data. A restoration section includes a decoding section for decoding the processed coded data to obtain the processed coefficient signals, and an inverse wavelet transformation section for performing an inverse wavelet transformation process on the processed coefficient signals to obtain a processed image signal subjected to the image processing. In the process of transforming an image signal to coded data, image processing is performed in parallel with a coding process so that a processed image can be quickly displayed only by performing a restoration process.

20 Claims, 11 Drawing Sheets

FOREIGN PATENT DOCUMENTS

| | | |
|---|---|---|
| JP | 55-116340 | 9/1980 |
| JP | 55-163472 | 12/1980 |
| JP | 56-11395 | 2/1981 |
| JP | 56-164645 | 12/1981 |
| JP | 06-274614 A | 9/1994 |
| JP | 06-339020 A | 12/1994 |
| JP | 09-161061 A | 6/1997 |
| JP | 11-041602 A | 2/1999 |

OTHER PUBLICATIONS

Patent Abstract of Japan 56-11395.

* cited by examiner

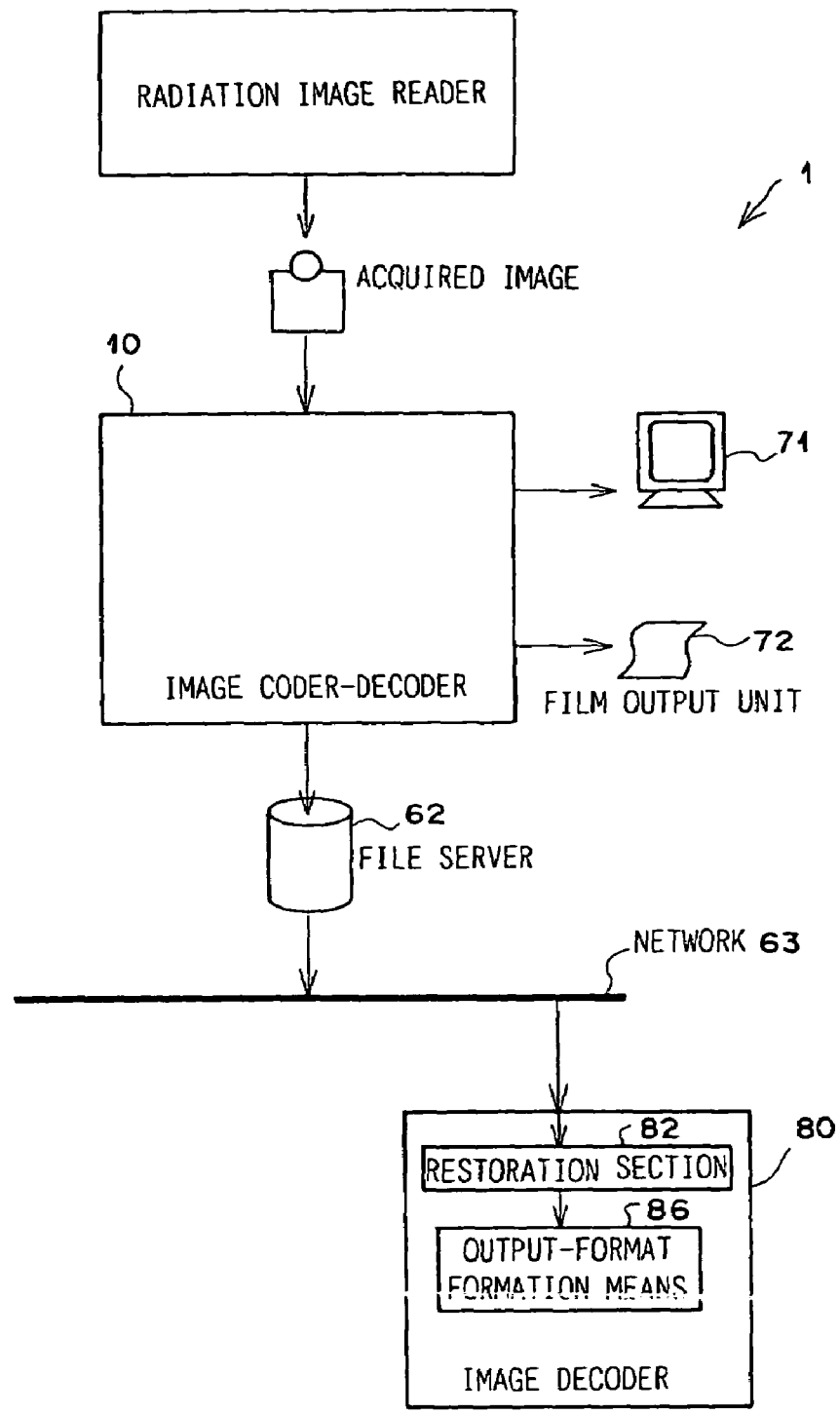
F I G. 1

CODED DATA
SPACE SCALABILITY

CODED DATA
SPACE SCALABILITY

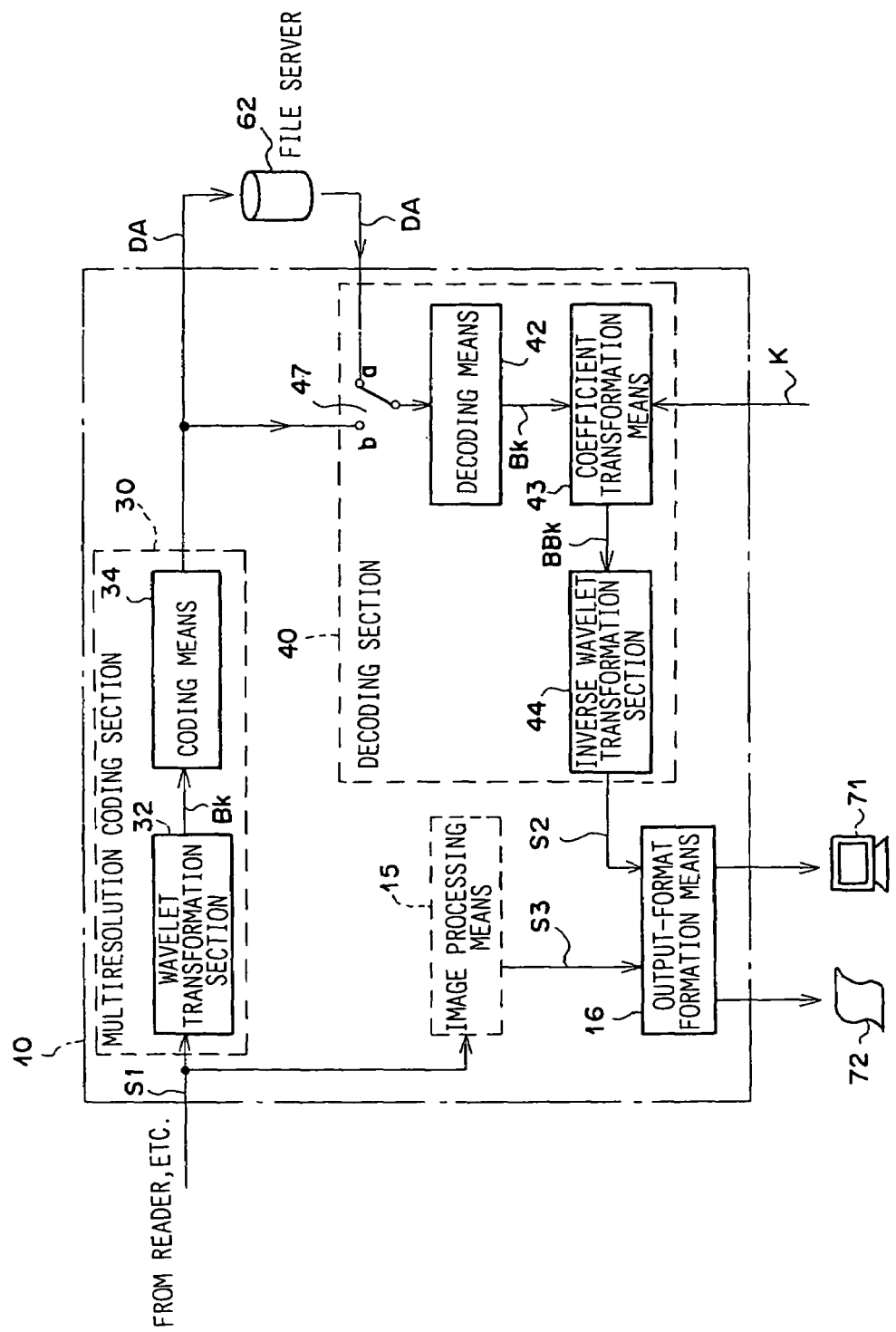
F I G. 12

IMAGE CODING-DECODING METHOD, IMAGE CODING-DECODING SYSTEM, IMAGE CODER, IMAGE DECODER, AND STORAGE MEDIUM

BACKGROUND OF THE INVENTION

1. Field of the Invention

The present invention relates to an image coding-decoding method, an image coding-decoding system, an image coder, an image decoder, and a storage medium, and more particularly to an image coding-decoding method and system for restoring a processed image by performing multi-resolution coding and decoding processes in addition to image processing, an image coder and decoder used in the image coding-decoding system, and a storage medium recording a program for making a computer execute the image coding-decoding method.

2. Description of the Related Art

Radiation recording-reproducing systems have been proposed in Japanese Unexamined Patent Publication Nos. 55(1980)-12429, 56(1981)-11395, 55(1980)-163472, 56(1981)-164645, 55(1980)-116340, etc. These systems utilize an accumulable phosphor (stimulatable phosphor), which stores part of radiation energy when illuminated with radiation, such as X-rays, etc., and emits photostimulated luminescent light according to the amount of the stored radiation energy when illuminated with excitation light such as visible light, etc. The radiation image of a subject, such as a human body, etc., is temporarily photographed and recorded on an accumulable fluorescent sheet. The accumulable fluorescent sheet with the radiation image emits photostimulated luminescent light when scanned with excitation light such as laser light, etc. The obtained photostimulated luminescent light is photoelectrically read and converted to an electrical image signal by photoelectric reading means such as a photomultiplier, etc. Based on the image signal, the radiation image of the subject is output as a visible image to a recording material such as a photosensitive material, etc., or to a cathode-ray tube (CRT) display unit, etc.

It is common practice that in the case where an image acquired by the aforementioned image reader is output on a CRT monitor or film and utilized for diagnosis, the acquired image is subjected to image processing, such as a gray level transformation process, a frequency enhancement process, a dynamic-range compression process, etc., so that it becomes an image suitable for observation.

On the other hand, a multiresolution coding method has recently been proposed as a high-efficient image coding method. In this method, a multiresolution transformation process is performed on an image signal which represents an image acquired by an image reader, a digital still camera, etc., in order to obtain hierarchical data for each resolution level which represents an image having a resolution of $1/2^P$ (where P is an integer) of the acquired image and a size of $1/2^{2P}$ of the acquired image. The data stored in all resolution levels is coded and compressed, whereby coded data with compressed redundancy is obtained. The coded data is stored. In addition, it is known that the aforementioned multiresolution transformation process utilizes, for example, wavelet transformation utilized in JPEG 2000, Laplacian pyramid transformation utilized in the Flash Pix file (proposed by Eastman Kodak), or Gaussian pyramid transformation.

If an image is stored by the aforementioned multiresolution coding method, the amount of stored information will be reduced and therefore storage efficiency will be enhanced, compared with the case of storing the original data. In addition, in the case where, based on coded data (image signal) subjected to the aforementioned multiresolution transformation process, an image is output as a visible image on a CRT monitor, film, etc., the image is restored and used in the same resolution level or image size as the acquired image, or in an intermediate resolution level or different size (enlarged or reduced size) from the size of the acquired image, depending on the application. Because of this, data transfer or image processing can be performed in the resolution level or image size required for actual reproduction and output. Particularly, if the aforementioned image processing, etc., is performed with a reduced image having a low-resolution level, the entire system can be operated at high speeds with high efficiency. For instance, in the case where there is a need to reproduce a high-quality image, as in the case of printers, a high-quality image with the same resolution and same size as the acquired image can be reproduced by performing image restoration, based on data stored in all resolution levels which represent images up to the highest-resolution level. On the other hand, when reproducing an image whose resolution is not so high as that of an image output by a printer, as in the case of CRT monitors, an image with a lower resolution and a smaller size than the acquired image can be reproduced based on data stored in a resolution level representing the reduced image, and if further necessary, an image with a lower resolution and a smaller size than the acquired image but suitable for the resolution and screen size of a CRT monitor can be reproduced by enlargement or reduction.

In the case where an image is reproduced based on the coded data stored by use of the aforementioned multiresolution coding method, however, the coded data has to be decoded to the original image signal, and furthermore, image reproduction has to be performed after a desired image processing. Thus, there is a problem that image reproduction will be time-consuming, by in direct correspondence to the extent to which the decoding process is required.

SUMMARY OF THE INVENTION

The present invention has been made in view of the aforementioned circumstances.

Accordingly, it is an object of the present invention to provide an image coding-decoding method and an image coding-decoding system which are capable of outputting a processed image in a short time even when performing multiresolution coding and decoding processes in addition to image processing.

Another object of the invention is to provide an image coder and an image decoder that are used in the image coding-decoding system.

Still another object of the invention is to provide a computer readable storage medium recording a program for making a computer execute the image coding-decoding method.

A first image coding-decoding method according to the present invention comprises the steps of: performing a multiresolution transformation process on an image signal to obtain multiresolution transformed signals; performing a coefficient transformation process, which corresponds to a desired image processing, on the multiresolution transformed signals to obtain processed transformed signals which carry a processed image subjected to the desired image processing; performing a coding process on the processed transformed signals to obtain processed coded data which carries the processed image; and decoding the processed coded data and further performing an inverse multiresolution transformation process, to obtain a processed image signal which carries the processed image.

A second image coding-decoding method according to the present invention comprises the steps of: performing a multiresolution transformation process on an image signal to obtain multiresolution transformed signals; performing a coding process on the multiresolution transformed signals to obtain coded data; decoding the coded data to obtain decoded transformed signals; performing a coefficient transformation process, which corresponds to a desired image processing, on the decoded transformed signal to obtain a processed transformed signal which carries a processed image subjected to the desired image processing; and performing an inverse multiresolution transformation process on the processed transformed signals to obtain a processed image signal which carries the processed image.

The expression "coefficient transformation process corresponding to image processing" is intended to mean the process of performing a coefficient transformation process on the multiresolution transformed signals or decoded transformed signals so that an image, restored by use of the multiresolution transformed signals or decoded transformed signals subjected to the coefficient transformation process, becomes a processed image having approximately the same characteristics as an image obtained by performing image processing in a real space region. Note that in the case where the coefficient transformation process is performed on the multiresolution transformed signals or decoded transformed signals, a coefficient transformation process corresponding to image processing in a real space region may be performed only on at least one desired signal of the signals obtained by multiresolution transformation.

A first image coding-decoding system according to the present invention is a system for carrying out the aforementioned first image coding-decoding method. The system comprises: multiresolution transformation means for performing a multiresolution transformation process on an image signal to obtain multiresolution transformed signals; coefficient transformation means for performing a coefficient transformation process, which corresponds to a desired image processing, on the multiresolution transformed signals to obtain a processed transformed signal which carries a processed image subjected to the desired image processing; coding means for performing a coding process on the processed transformed signals to obtain processed coded data which carries the processed image; decoding means for decoding the processed coded data; and inverse multiresolution transformation means for performing an inverse multiresolution transformation process on the processed transformed signals to obtain a processed image signal which carries the processed image.

A second image coding-decoding system according to the present invention is a system for carrying out the aforementioned second image coding-decoding method. The system comprises: multiresolution transformation means for performing a multiresolution transformation process on an image signal to obtain multiresolution transformed signals; coding means for performing a coding process on the multiresolution transformed signals to obtain coded data; decoding means for decoding the coded data to obtain decoded transformed signals; coefficient transformation means for performing a coefficient transformation process, which corresponds to desired image processing, on the decoded transformed signals to obtain processed transformed signals which carries a processed image subjected to the desired image processing; and inverse multiresolution transformation means for performing an inverse multiresolution transformation process on the processed transformed signals to obtain a processed image signal which carries the processed image.

An image coder according to the present invention is used in the aforementioned first image coding-decoding system. The image coder comprises: multiresolution transformation means for performing a multiresolution transformation process on an image signal to obtain multiresolution transformed signals; coefficient transformation means for performing a coefficient transformation process, which corresponds to a desired image processing, on the multiresolution transformed signals to obtain processed transformed signals which carry a processed image subjected to the desired image processing; and coding means for performing a coding process on the processed transformed signals to obtain processed coded data which carries the processed image.

An image decoder according to the present invention is used in the aforementioned second image coding-decoding system. The image decoder comprises: decoding means for decoding coded data to obtain decoded transformed signals; coefficient transformation means for performing a coefficient transformation process, which corresponds to a desired image processing, on the decoded transformed signals to obtain processed transformed signals which carry a processed image subjected to the desired image processing; and inverse multiresolution transformation means for performing an inverse multiresolution transformation process on the processed transformed signals to obtain a processed image signal which carries the processed image.

Note that the image coder and the image decoder may be constructed integrally with each other. In such a case, the integrated unit functions as an image coding-decoding system.

The coded data, which is input to both the system for carrying out the second image coding-decoding method and the decoding means provided in the image decoder, may be data, subjected to a coefficient transformation process corresponding to image processing, which is employed in both the system for carrying out the first image coding-decoding method and the image coder. In this case, the coefficient transformation process corresponding to image processing is performed in both the process of transforming an image signal to coded data and the process of decoding the coded data to restore an image.

Note that a program, for making a computer execute the aforementioned method, may be recorded on a computer readable storage medium.

According to the present invention, a high-quality image subjected to a desired image processing can be obtained only by performing an inverse multiresolution transformation process, because a coefficient transformation process is performed in the process of transforming an image signal to coded data and/or in the process of decoding the coded data to restore an image. This makes it possible to code image data with high efficiency and provide a high-quality image subjected to image processing. In addition, it is equivalent to performing image processing in parallel with coding and/or decoding, so a processed image can be utilized (e.g., displayed) in a short time.

BRIEF DESCRIPTION OF THE DRAWINGS

The present invention will be described in further detail with reference to the accompanying drawings wherein:

FIG. 1 is a block diagram showing an image coding-decoding system for carrying out an image processing coding-decoding method of the present invention;

FIG. 12 is a block diagram showing an image coder-decoder constructed according to a second embodiment of the present invention.

DESCRIPTION OF THE PREFERRED EMBODIMENTS

Figure 2:
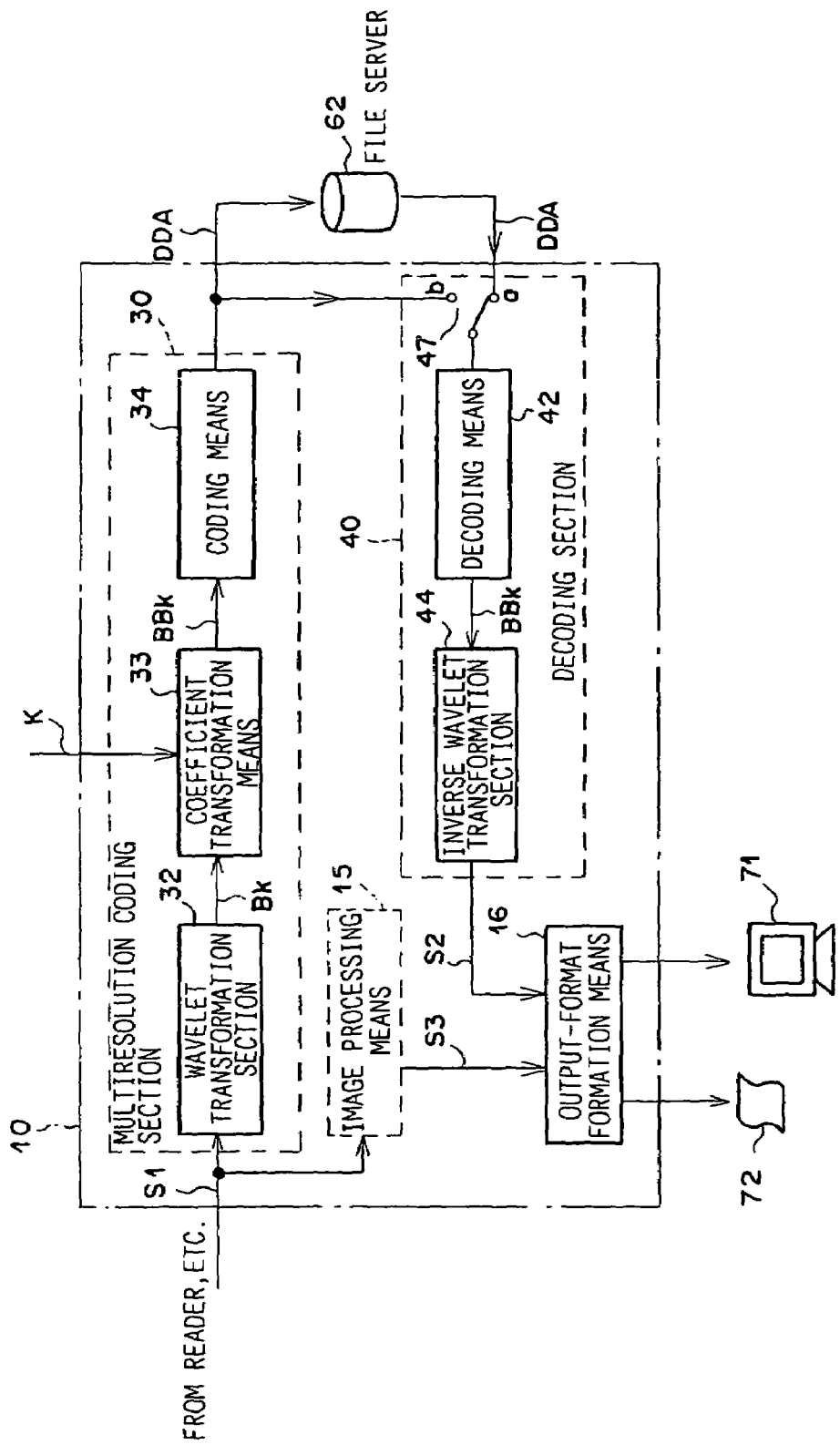
FIG. 2 is a block diagram showing an image processing coder-decoder of a first embodiment which carries out the image processing coding-decoding method of the present invention.

Referring now in greater detail to the drawings and initially to FIG. 1, there is shown an image coding-decoding system utilizing an image coding-decoding method of the present invention. As shown in the figure, the image coding-decoding system 1 comprises an image coder-decoder 10, a file server 62, a network 63, a CRT monitor 71, a film output unit 72, and an image decoder 80.

This image coding-decoding system 1 performs a desired image processing, such as a gray level transformation process, a frequency enhancement process, or a dynamic range compression process, on an image signal, which represents an acquired image (high-quality (HQ) image) obtained with a reader (not shown) by high-density reading of the radiation image of a human body recorded on an accumulable fluorescent sheet, so that the acquired image is reproduced and output in a desired layout (output size, disposition, etc.) on the CRT monitor 71, or so that an image recorded on film by the film output unit 72 becomes an image suitable for diagnosis. The image coding-decoding system 1 also reproduces an image after storing coded data DDA (obtained by coding the image signal S1) in the file server 62, or after transmitting the coded data DDA to an outside unit (e.g., an image decoder 80 in FIG. 1) through the network 63.

The image coder-decoder 10 has a multiresolution coding section 30, a restoration section 40, and output-format formation means 16, as shown in FIG. 2. The multiresolution coding section 30 performs a multiresolution transformation process on the image signal S1 carrying the HQ-image read by a reader (not shown). The multiresolution coding section 30 also quantizes the transformed coefficient signals BBk obtained by the multiresolution transformation and then performs coding (multiresolution coding process), thereby obtaining coded data DDA. The restoration section 40 restores the coded data DDA read out from the file server 62, thereby obtaining a processed image signal S2. The output-format formation means 16 forms a desired output format by use of the restored image signal S2 so that the processed image can be reproduced and output in the desired output format.

The multiresolution coding section 30 has a wavelet transformation section 32, coefficient transformation means 33, and coding means 34. The wavelet transformation section 32 performs a multiresolution transformation (decomposition) process (which is pixel-density transformation employing a wavelet transformation process) on the image signal S1 represented in a real space region, thereby obtaining wavelet-transformed coefficient signals Bk (one form of a band-limited image signal, which will hereinafter be also referred to simply as a coefficient signal or a signal) that can be handled in a frequency domain. The coefficient transformation means 33 performs a coefficient transformation process, such as a gray level transformation process, etc., which corresponds to a desired image processing, on the decomposed coefficient signals Bk (a plurality of frequency subband signals) obtained by the wavelet transformation section 32. The coding means 34 quantizes the processed coefficient signals BBk subjected to the coefficient transformation process, and then codes the coefficient signals BBk in accordance with a predetermined coding rule, thereby obtaining the processed coded data DDA. Information K, indicating image-processing type, image-processing parameters, etc., is input to the coefficient transformation means 33.

The coding rule in the coding means 34 may employ a reversible coding method, such as a Joint Photographic Experts Group (JPEG) method, an entropy coding method widely used in JPEG-LS, etc., or may employ an irreversible coding method adopting various known methods, in order to enhance compressibility (e.g., about ⅕ to ½₀).

The restoration section 40 has decoding means 42, an inverse wavelet transformation section 44, and switch means 47. The decoding means 42 corresponds to the coding means 34 so that an image (processed coded data DDA) stored in the file server 62 can be read out for reproduction and output. The inverse wavelet transformation section 44 corresponds to the aforementioned wavelet transformation section 34, and the switch means 47 selectively inputs either the processed coded data DDA output from the coding means 34, or the processed coded data DDA read out from the file server 62, to the decoding means 42.

On the other hand, an image decoder 80 (see FIG. 1), connected with the image coder-decoder 10 through the network 63, is provided with a restoration section 82 and output-format formation means 86, which have the same construction as the restoration section 40 and output-format formation means 16 provided in the image coder-decoder 10. Although not shown in FIG. 1, the image decoder 80 is connected with a CRT monitor, a film output unit, etc.

If, in the aforementioned image coding-decoding system 1, the image signal S1 carrying an acquired image (HQ-image) is input from a reader, etc., to the image coder-decoder 10, the multiresolution coding section 30 performs a multiresolution transformation process (e.g., wavelet transformation in this embodiment), whereby the image signal S1 is transformed into multiresolution signals (e.g., wavelet-transformed coefficient signals Bk in this embodiment). Furthermore, the wavelet-transformed coefficient signals Bk are subjected to a coefficient transformation process corresponding to image processing, and are then quantized and coded, whereby processed coded data DDA is obtained. The processed coded data DDA is stored temporarily in the file server 62 and read out to the restoration section 40. In the restoration section 40, the switch means 47 is switched to an input terminal a, and processing inverse to the processing in the aforementioned multiresolution coding section 30, i.e., a decoding process, an inverse quantization process, and an inverse multiresolution transformation process (e.g., an inverse wavelet transformation process in this embodiment) are performed, whereby a processed image signal S2 is obtained. The processed image signal S2 is input to the output-format formation means 16. In this manner, the processed image, obtained by performing a predetermined image processing on the HQ-image, is reproduced and output on the CRT monitor 71, or is output on film by the film output unit 72. The output image is to be used for diagnosis. Note that if the switch means 47 is switched to an input terminal b, the processed image can be reproduced without storing the processed coded data DDA in the file server 62. As shown by a broken line in the left central portion of FIG. 2, if the image coder-decoder 10 is provided with image processing means 15 for obtaining a processed image signal S3 by performing a desired image processing on the image signal S1, and the processed image signal S3 is input to the output-format formation means 16, the image coder-decoder 10 is also capable of reproducing a processed image by performing a desired image processing on the image signal S1, input without being passed through the file server 62 and the restoration section 40.

Now, the image processing function of the multiresolution coding section 30 and the image restoring function of the restoration section 40 will be described in detail.

Figure 3:
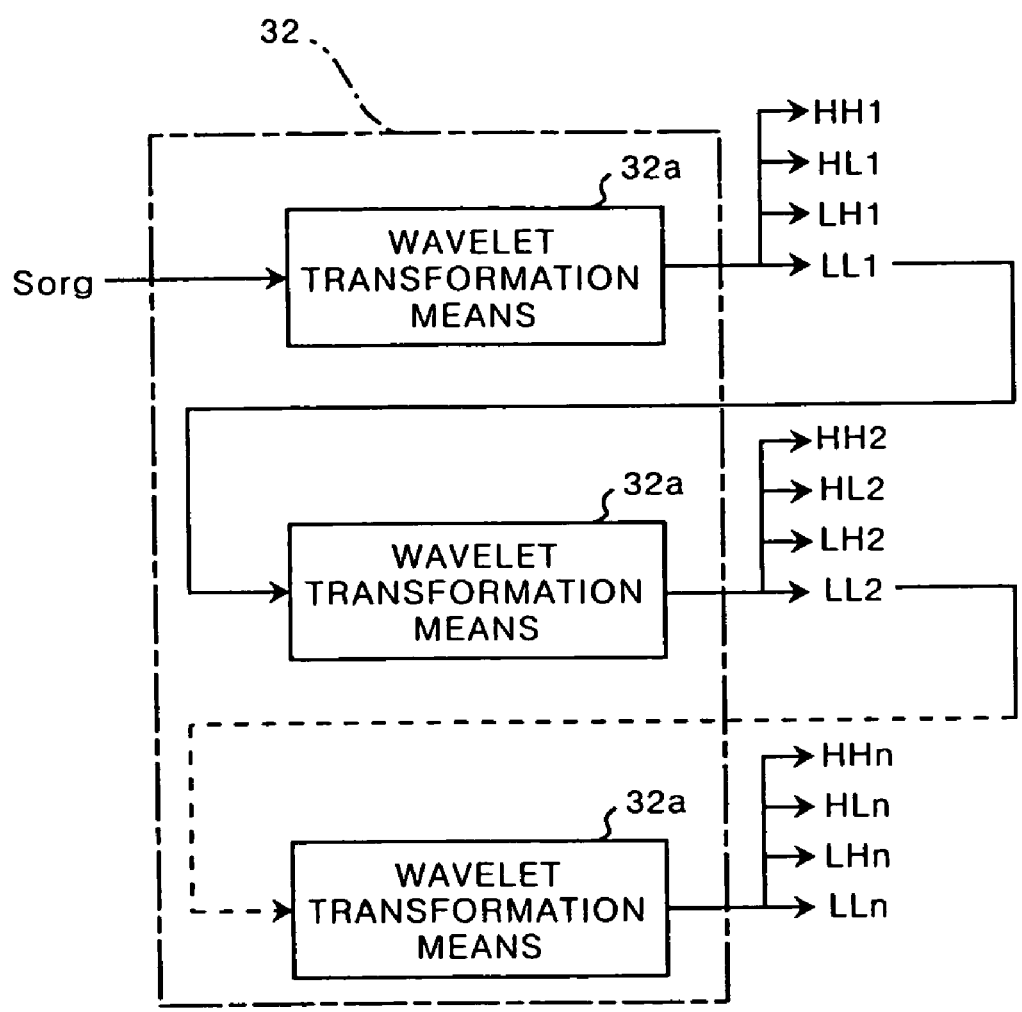
FIG. 3 is a block diagram showing how a wavelet transformation process is performed by the wavelet transformation section of the image processing coder-decoder shown in FIG. 1.
Figure 4:
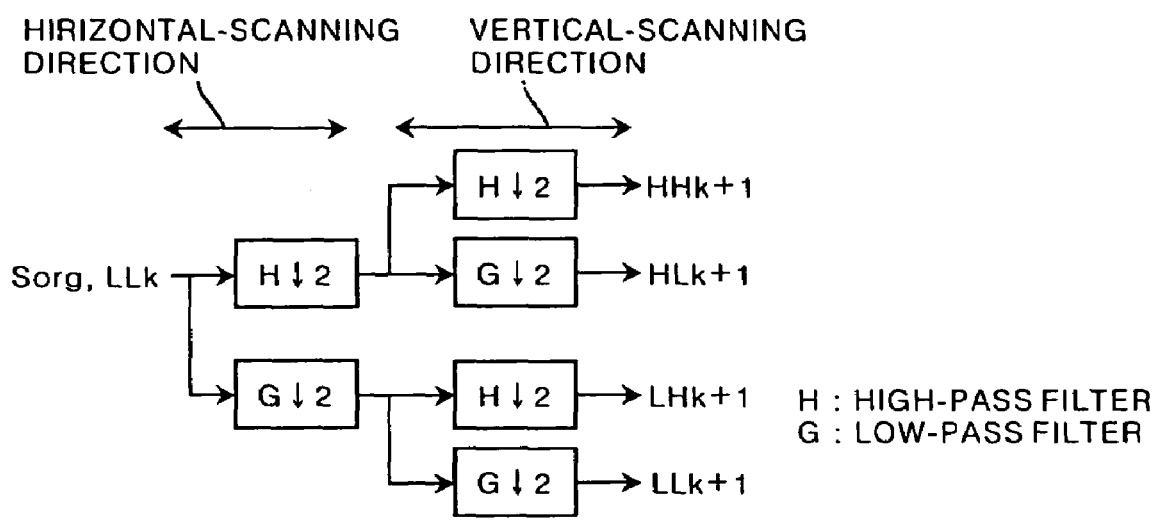
FIG. 4 is a block diagram showing wavelet transformation means provided in the wavelet transformation section.

FIG. 3 shows how the wavelet transformation process as the multiresolution transformation process is performed by the wavelet transformation section 32. FIG. 4 shows each wavelet transformation means 32a in detail. As shown in FIG. 3, the wavelet transformation section 32 is provided with a number of wavelet transformation means 32a that corresponds to the number of resolution (pixel density) levels. Similarly, an inverse wavelet transformation section 34 to be described later is provided with a number of inverse wavelet transformation means 34a which corresponds to the total number of wavelet transformation means 32a. Note that in this embodiment a two-dimensional orthogonal wavelet transform is performed in which the wavelet transform coefficients are orthogonal to one another.

As shown in FIGS. 3 and 4, if the image signal S1 representing an input HQ-image is input to the wavelet transformation section 32, the image signal S1 is handled as an original image signal $S_{ori}$, which is subjected to a wavelet transformation process. More specifically, the original image signal $S_{ori}$ (equivalent to a signal LL0 representing the HQ-image) is subjected to a filtering process in the horizontal-scanning direction by basic wavelet functions H0, G0, and the pixels in the horizontal-scanning direction are thinned out at every other pixel, whereby the number of pixels in the horizontal-scanning direction is reduced to one half. Note that the thinned-out signal obtained in this way is represented by "↓2" in FIG. 4. Also, the function H0 is a high-pass filter, while the function G0 is a low-pass filter. Furthermore, the filtering process is performed on each of the thinned-out signals in the vertical-scanning direction by the aforementioned functions H0, G0, and the pixels in the vertical-scanning direction are thinned out at every other pixel, whereby the number of pixels in the vertical-scanning direction is reduced to one half. In this manner, wavelet-transformed coefficient signals HH1, HL1, LH1, and LL1 are obtained. The signal LL1 represents a one-fourth reduction image obtained by reducing the original image to one half in both the vertical and horizontal directions. In the respective one-fourth reduction images of the original image, the signal LH1 indicates an image representing a vertical high-frequency component (horizontal edge), the signal HL1 indicates an image representing a horizontal high-frequency component (vertical edge), the signal HH1 indicates an image representing a diagonal high-frequency component (diagonal edge), and the signal LL1 indicates a standard-quality (SQ) image that is an image representing a low-frequency component with a resolution of one-half of the HQ-image.

Subsequently, in the wavelet transformation means 32a, the signal LL1 is subjected to a wavelet transformation process by the use of basic wavelet functions H0, G0, whereby signals HH2, HL2, LH2, and LL2 are obtained. The signal LL2 indicates a one-sixteenth reduction image obtained by reducing the original image to one-fourth in both the vertical and horizontal directions. In the one-sixteenth reduction images of the original image, the signals HL2, LH2, and HH2, as with the aforementioned, indicate images representing vertical edge, horizontal edge, and diagonal edge components, respectively.

In the same manner as the aforementioned second stage, wavelet-transformed coefficient signals LLk obtained for each frequency band are subjected to a wavelet transformation process by n times, whereby wavelet-transformed coefficient signals HH1 to HHn, HL1 to HLn, LH1 to LHn, and LL1 to LLn (represented by wavelet-transformed coefficient signals Bk) are obtained. The wavelet-transformed coefficient signals HHn, HLn, LHn, and LLn, obtained by the $n^{th}$ wavelet transformation, each represent a $(\frac{1}{2})^{2n}$ reduction image in which the number of pixels in each of the horizontal and vertical directions is $(\frac{1}{2})^n$, compared with the original image signal $S_{org}$. The greater the "n" in the wavelet-transformed coefficient signals HHn, HLn, LHn, and LLn, the lower the frequency band. Thus, each of the wavelet-transformed coefficient signals HHk, HLk, LHk, and LLk (where k is an integer of 1 to n, representing a resolution level) becomes a band-limited image signal which carries a frequency component in a predetermined frequency range contained in the frequency range of the original image signal $S_{org}$. A greater "k" represents a lower-resolution level. The signal HHk represents horizontal and vertical frequency changes in the original image signal $S_{org}$, and becomes a lower-frequency signal if "k" is greater. The signal HLk represents a horizontal frequency change in the original image signal $S_{org}$, and becomes a lower-frequency signal if "k" is greater. Furthermore, the signal LHk represents a vertical frequency change in the original image signal $S_{org}$, and becomes a lower-frequency signal if k is greater.

Note that, as proposed in Japanese Patent Application No. 11(1999)-374397 by the applicant of this application, a moire suppression process can also be performed, if at least the initial-stage filter in wavelet transformation has a moire suppression function.

Figures 5A, 5B:
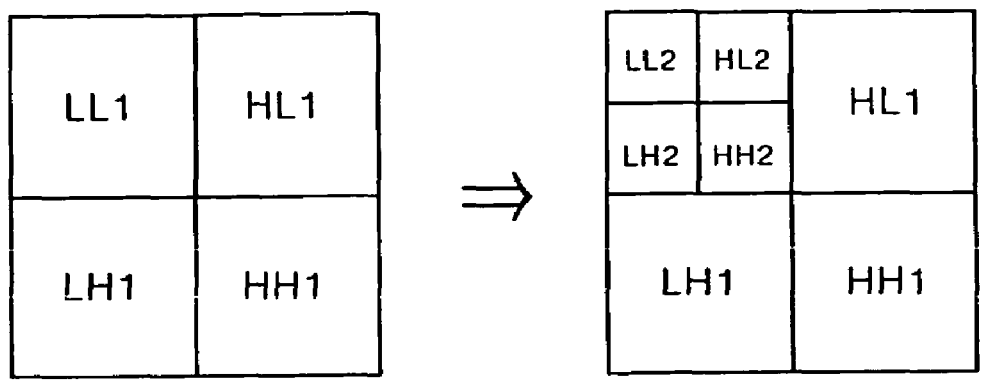
FIG. 5A is a diagram showing the decomposed components of an original image signal obtained when a two-dimensional wavelet transformation process is performed on the original image signal.
FIG. 5B is a diagram showing the decomposed components obtained when the two-dimensional wavelet transformation process is further performed.

FIG. 5 shows how an original signal is decomposed into components by wavelet transformation. In FIG. 5A the original signal (LL0) is decomposed into four signals LL1, HL1, LH1, and HH1 by performing a two-dimensional wavelet transformation process on the original signal. In FIG. 5B the signal HL1 is decomposed into signals LL2, HL2, LH2, and HH2 by performing the two-dimensional wavelet transformation process on the signal HL1.

Note that, as will be appreciated from the aforementioned description for the wavelet transformation section 32, if the signal LLk representing an image with a resolution level less than that of the SQ image is input to the image processing means 15, a $(1/2)^{2k}$ reduction image with a $(1/2)^k$ resolution, obtained by reducing the original image to $(1/2)^k$ in both the horizontal-scanning and vertical-scanning directions, can also be reproduced and output by the CRT monitor 71, etc.

If the wavelet-transformed coefficient signals HH1 to HHn, HL1 to HLn, LH1 to LHn, and LL1 to LLn (LL1~LLk (where k<n) as occasion demands) are obtained in the aforementioned manner, the coefficient transformation means 33 performs a coefficient transformation process (corresponding to image processing) on a desired coefficient signal Bk, thereby obtaining processed coefficient signals BBk (which represent processed coefficient signals, as in the case of "Bk"). Now, examples of the coefficient transformation process will be described.

A first method is that each coefficient signal (excluding the signal LLk) with a predetermined resolution level "k" or greater (the value of "k" becomes smaller) is made zero. For instance, the coefficient signals HH1, HH2, HL1, HL2, LH1, and LH2 of resolution level 2 or greater, shown in FIG. 5B, are all made zero, and only the coefficient signal LL2 and signals thereafter, which have resolution level 2 or less (the value of "k" becomes greater), are made effective. As described above, the signal LHk is an image representing a vertical high-frequency component, the signal HLk is an image representing a horizontal high-frequency component, and the signal HHk is an image representing a diagonal high-frequency component. Therefore, making the aforementioned coefficient signals zero is equivalent to suppressing the high-frequency components in the aforementioned directions. That is, the first method corresponds to the process of suppressing high-frequency components in a real space region and is capable of obtaining, for example, the effect of suppressing graininess which will become a problem at the time of low-dose photography. Note that even if coefficient signals are merely made smaller than the original values instead of being made zero, the effect can be obtained in its own way.

Figure 6:
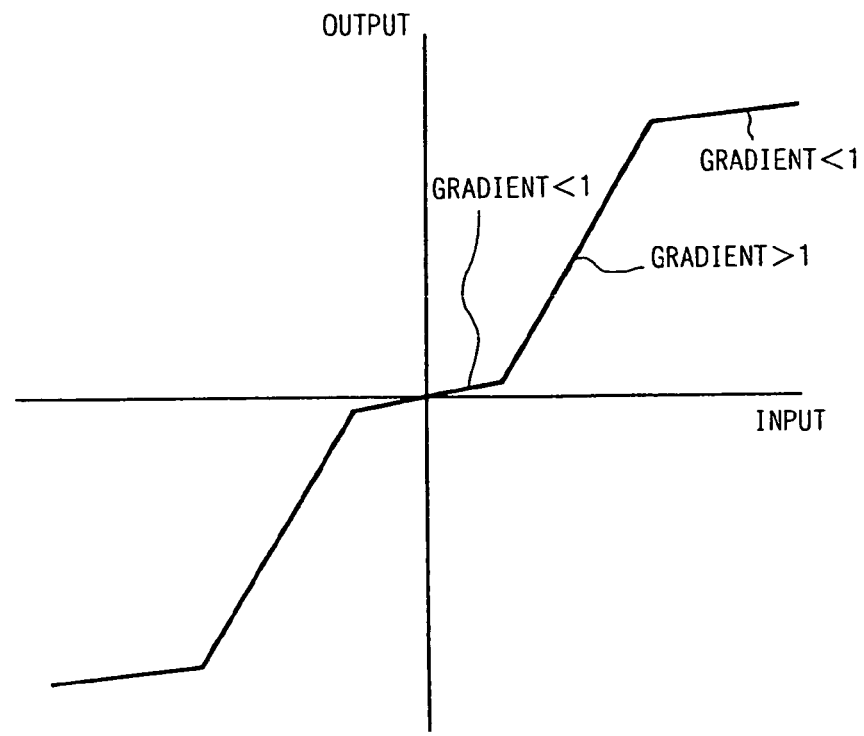
FIG. 6 is a diagram showing an example of a nonlinear transform function.

A second method is that a nonlinear transformation process is performed on coefficient signals (excluding signals LLk), which have a predetermined resolution level k or greater (the value of k becomes smaller), such as coefficient signals HH1, HH2, HL1, HL2, LH1, and LH2 with resolution level 2 or greater, shown in FIG. 5B. The nonlinear transformation process may employ a nonlinear transform function whose gradient becomes less than 1 when an input coefficient signal is outside a predetermined range and becomes greater than 1 when it is within the predetermined range, as shown in FIG. 6. With this nonlinear transform function, intermediate-level signals, excluding a high-frequency component with a relatively greater or smaller level, are transformed with a gradient greater than 1, whereby only these intermediate-level signals can be enhanced. In addition, signals with a smaller level are transformed with a gradient less than 1, so the effect of suppressing high-frequency noise can be obtained. Furthermore, signals with a greater level are transformed with a gradient less than 1, so that the influence of a signal with a relatively greater absolute value near the edge portion, which can be the cause of artifacts, can be reduced. That is, the second method corresponds to the frequency enhancement process that has both the high-frequency noise suppressing effect and the artifact suppressing effect. Note that the gradient of a nonlinear transform function to be used may be varied according to each resolution level. Furthermore, the artifact suppressing effect may be further enhanced by making output values smaller than an input value as a whole.

Figure 7:
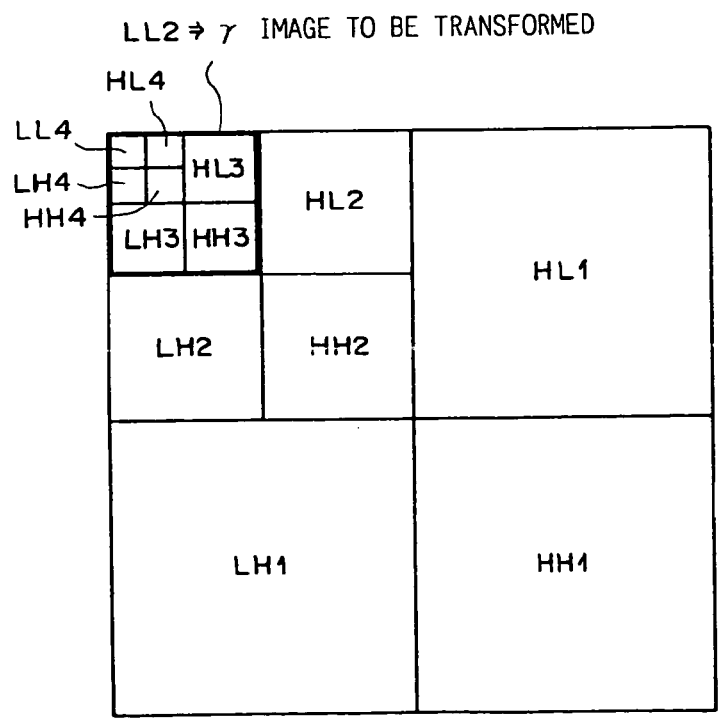
FIG. 7 is a diagram used for explaining a variation of a gray level (γ) transformation process.
Figure 8:
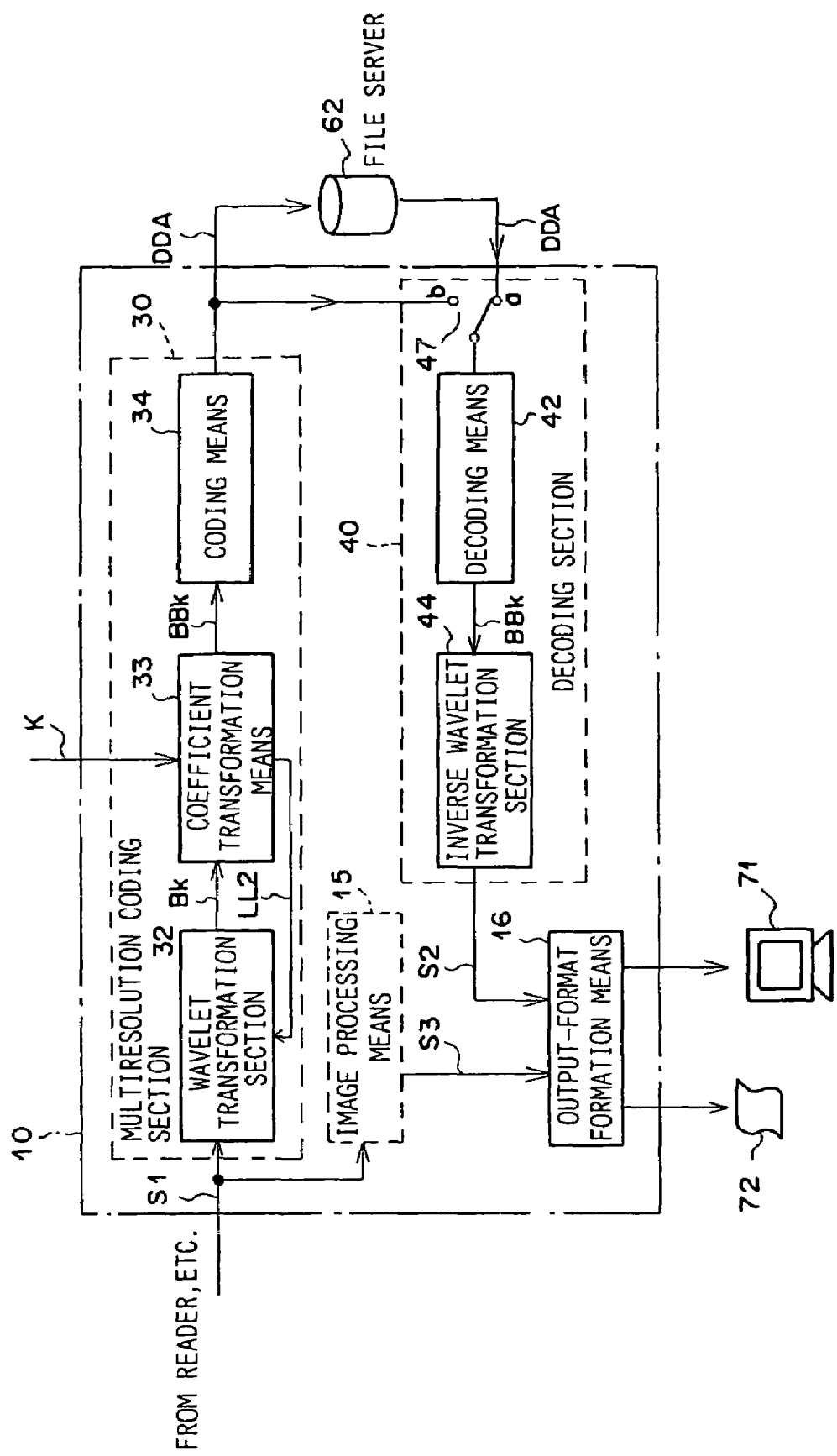
FIG. 8 is a block diagram showing an image coding-decoding system for carrying out the variation of the gray level (γ) transformation process shown in FIG. 7.

As a third method, there is a method in which a coefficient transformation process is performed only on a signal LLk with a predetermined resolution level k (e.g., the lowest-resolution signal LLn) so that it becomes equivalent to a γ-transformation process (gray level transformation process) in a real space (original-image space). The remaining coefficient signals remain unchanged. The signal LLk represents a $(1/2)^{2k}$ reduction image obtained by reducing the original HQ-image to $(1/2)^k$ in the horizontal and vertical directions. Therefore, as with the γ-transformation process in a real space, the coefficient transformation process can be easily performed, for example, by use of a transforming table (look-up table). In addition, because a reduced image is employed, processing (calculation) can be performed in a reduced time shortened in direct correspondence to the amount that the number of pixels of the reduced image is reduced. Thus, the third method corresponds to the gray level transformation process in a real space region. As shown in FIG. 7, in the case where the coefficient transformation process corresponding to the gray level transformation process is performed on a signal LLk with an intermediate level (e.g., the signal LL2 in FIG. 7), not the lowest-resolution signal LLn, the signal LL2 from coefficient transformation means 33 is fed back to wavelet transformation means 32, as in a multiresolution coding section 30 shown in FIG. 8. The signal LL2, subjected to the coefficient transformation process corresponding to the gray level transformation process, is subjected to the wavelet transformation processes thereafter.

The coefficient transformation means 33 performs the coefficient transformation process (image processing) on a desired coefficient signal of the coefficient signals Bk, and inputs the processed coefficient signals BBk (including unprocessed coefficient signals Bk) to the coding means 34. In the coding means 34, the coefficient signals BBk are subjected to a quantization process and a coding process and transformed to processed coded data DDA. The transformed data DDA is stored in the file server 62. When an image is reproduced based on user's request, the processed coded data DDA is subjected to an image restoration process by the restoration section 40, or the data DDA is transferred to an outside unit (e.g., the image decoder 80 in this embodiment) through the network 63 and is subjected to an image restoration process.

Figure 9A:
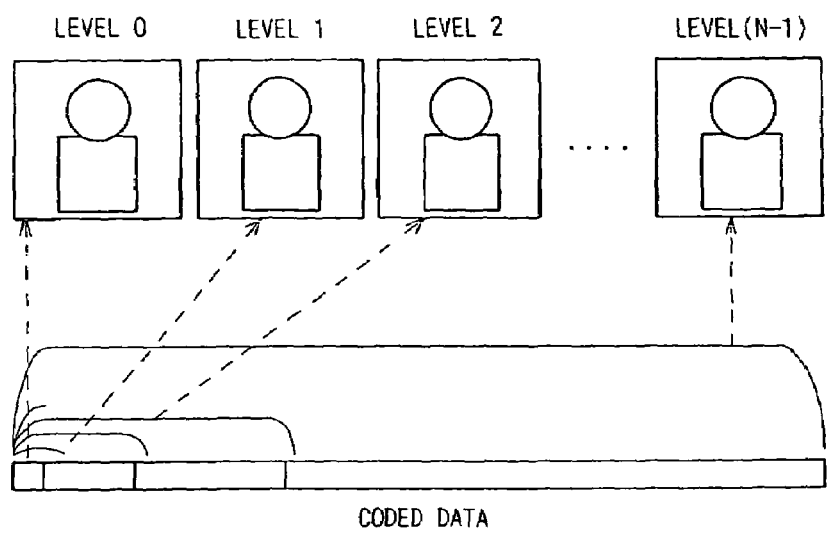
FIG. 9A is a diagram used to explain SNR scalability.
Figure 9B:
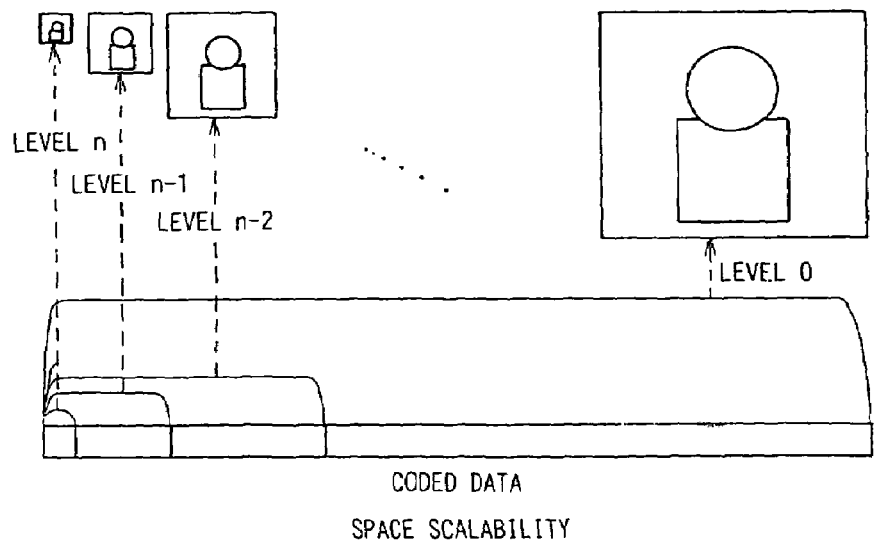
FIG. 9B is a diagram used to explain space scalability.

Note that when an image, stored after quantization and coding, is transferred and then restored, SNR or space scalability used in Moving Picture Experts Group-4 (MPEG-4) standards may be employed. The SNR scalability is a method of hierarchically quantizing wavelet-transformed coefficient signals. As conceptually shown in FIG. 9A, wavelet-transformed coefficient signals are first quantized and coded in a coarse quantization step, and the quantization errors in the wavelet-transformed coefficient signals are quantized and coded in quantization steps that become gradually narrower in size in sequence. In an image processor where the wavelet-transformed coefficient signals are transferred, a processed image containing slight distortion (noise) can be reproduced by decoding only the first part of the received coded data, and the signal-to-noise (S/N) ratio in the processed image can be gradually enhanced by decoding the coded data, obtained by quantizing quantization errors finely in sequence. On the other hand, the space scalability is a method of sequentially performing quantization by stages from a wavelet-transformed coefficient signal (for the lowest-frequency component) whose resolution level is lowest. As conceptually shown in FIG. 9B, a wavelet-transformed coefficient signal for a low-frequency component is first quantized and coded, and higher-frequency components are coded in sequence. In an image processor where the wavelet-transformed coefficient signals are transferred, a processed image for a low-frequency component (lowest-resolution level) can be reproduced by decoding only the first part of the received coded data. The space resolution can be gradually enhanced by decoding coded data, received in sequence, which corresponds to a high-frequency component, and finally, a processed image with the same resolution level 0 as the HQ-image can be obtained.

Now, a description will be given of a method in which an image is restored based on the processed coded data DDA stored in the file server 62. The processed coded data DDA is read from the file server 62 into the restoration section 40 and input to the decoding means 42 via the input terminal a of the switch means 42. In the decoding means 42, a decoding process and an inverse quantization process, corresponding to the processing in the coding means 34, are performed on the coded data DDA, whereby the processed coefficient signals BBk are restored.

Thereafter, in the inverse wavelet transformation section 34, the processed coefficient signals BBk (processed or unprocessed signals LLn, HLk, LHk, and HHk) are sequentially subjected to an inverse wavelet transformation process from the lowest resolution level n to the original resolution level (which is the resolution level 0 of the HQ-image).

Figure 10:
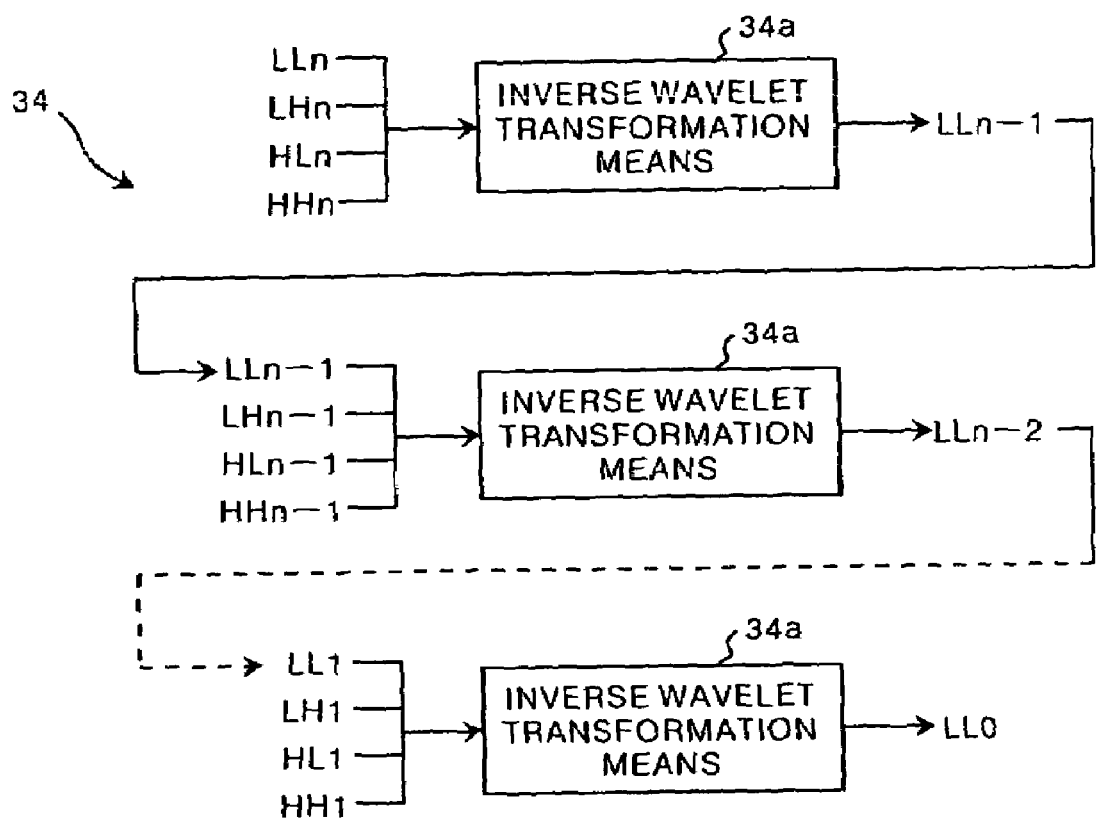
FIG. 10 is a block diagram showing the construction of an inverse wavelet transformation section provided in the image coding-decoding system.
Figure 11:
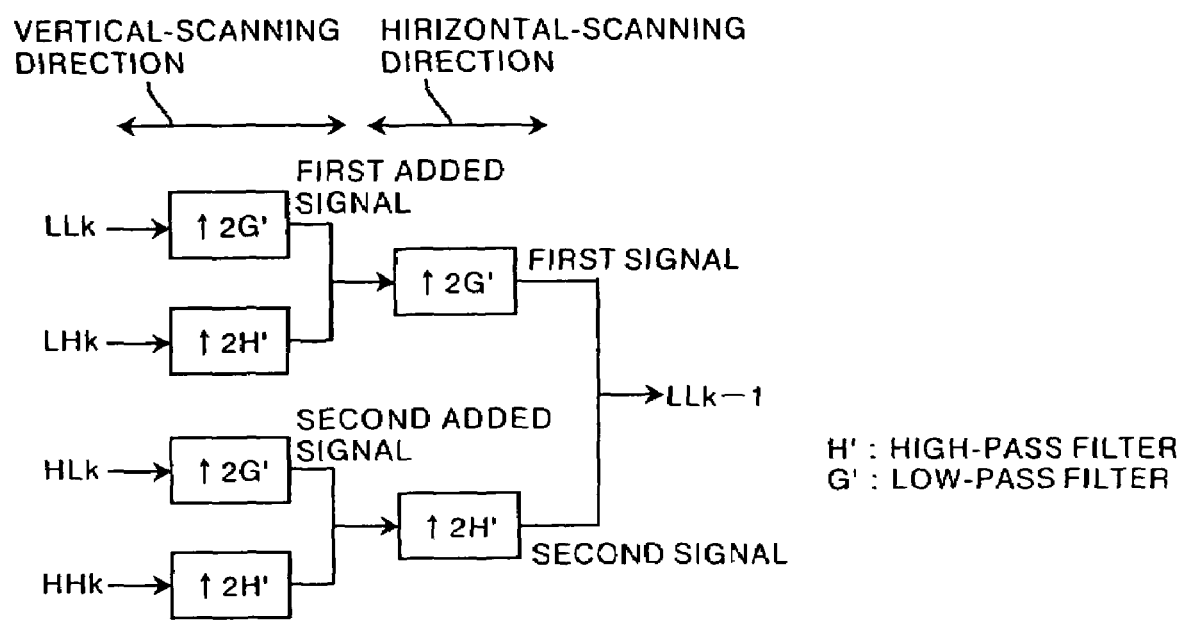
FIG. 11 is a block diagram showing how an inverse wavelet transformation process is performed by inverse wavelet transformation means provided in the inverse wavelet transformation section shown in FIG. 10.

FIG. 10 shows the construction of the inverse wavelet transformation section 34. FIG. 11 shows how an inverse wavelet transformation process is performed by each inverse wavelet transformation means 34a provided in the inverse wavelet transformation section 34. As shown in FIG. 10, in the inverse wavelet transformation means 34a, the signals HHn, HLn, LHn, and LLn in the lowest-frequency band are first subjected to an inverse wavelet transformation process, whereby an signal LLn-1 is obtained.

As shown in FIG. 11, when performing the inverse wavelet transformation process, signals LLn (LLk) and LHn(LHk) are first subjected to a process of leaving space for 1 pixel between adjacent pixels, in the vertical-scanning direction. This process is represented by "↑2" in FIG. 11. The signals are also subjected to a filtering process in the vertical-scanning direction by the inverse wavelet transform functions G0' and H0' that correspond to the functions G0 and H0 employed in performing wavelet transformation. The processed signals are added. Furthermore, the signal obtained by addition (referred to as a first added signal) is subjected to the aforementioned space leaving process in the horizontal-scanning direction, and is subjected to the filtering process in the horizontal direction by the function G0'. In this manner, a first signal is obtained. On the other hand, signals HLn (HLk) and HHn(HHk) are subjected to the process of leaving space for 1 pixel between adjacent pixels, in the vertical-scanning direction. These signals are also subjected to the filtering process in the vertical-scanning direction by the inverse wavelet transform functions G0', H0', and are added. Furthermore, the signal obtained by addition (referred to as a second added signal) is subjected to the process of leaving space for 1 pixel between adjacent pixels, in the horizontal-scanning direction, and is also subjected to the filtering process in the horizontal-scanning direction by the function H1'. In this way, a second signal is obtained. The first signal and the second signal are added, whereby a signal LLn-1(LLk-1) is obtained.

Next, in the inverse wavelet transformation means 34a, the signals HHn-1, HLn-1, LHn-1, and LLn-1 are subjected to an inverse wavelet transformation process in the same manner as the aforementioned, whereby a processed signal LLn-2 is obtained. In the same way as the aforementioned, a signal LL0 is obtained by repeating the inverse wavelet transformation process down to resolution level 0. This signal LL0 becomes a processed image signal S2 that carries the processed image subjected to the aforementioned desired image processing.

The processed image signal S2 restored in this manner is input to the output-format formation means 16 and is then reproduced and output as a visible image by the CRT monitor 71, etc. In the coefficient transformation means 33 of the multiresolution coding section 30, the coefficient transformation process corresponding to a desired image processing has already been performed. Therefore, even if an image is reproduced and output only by performing a decoding process and an inverse wavelet transformation process, the restored image will be a processed image obtained by performing image processing on the HQ-image. Note that if a signal LLk restored up to an intermediate resolution level is input to the output-format formation means 16, a reduced image subjected to image processing can also be reproduced and output. Thus, this embodiment is convenient for obtaining a reduced image subjected to image processing, because it employs wavelet transformation as multiresolution transformation.

In addition, in the restoration section 82 of the image processor 80 connected to the network 63, a processed image or reduced image, obtained by performing image processing on the HQ-image, can be restored based on the transferred coded data DDA in the same manner as the aforementioned description.

Thus, the image coding-decoding system 1 according to the present invention is capable of quickly providing (reproducing and outputting) a processed high-quality image in accordance with a user's needs, only by performing an image restoration process on the processed coded data DDA, because image processing is performed in the multiresolution coding process in which the image signal S1 is transformed to coded data.

FIG. 12 shows an image coder-decoder constructed according to a second embodiment of the present invention. The second embodiment differs from the first embodiment in that a coefficient transformation process (image processing) is performed in a restoration section 40 instead of being performed in a multiresolution coding section 30.

As shown in FIG. 12, the restoration section 40 in the image coder-decoder 10 according to the second embodiment includes coefficient transformation means 43, provided between decoding means 42 and an inverse wavelet transformation section 44, which performs a coefficient transformation process corresponding to a desired image processing. On the other hand, the coefficient transformation means 33 provided in the first embodiment is not provided between the wavelet transformation section 32 and coding means 34 of a multiresolution coding section 30. With this arrangement, the coded data DA obtained by the image coder-decoder 10 of the second embodiment carries the HQ-image not subjected to image processing.

Similarly, the restoration section 82 of an image decoder 80 (refer to FIG. 1), connected with the image coder-decoder 10 of the second embodiment through the network 63, has the same construction as the restoration section 40 provided in the image coder-decoder 10, unlike the first embodiment.

When an image is restored based on the coded data DA by the image coder-decoder 10 of the second embodiment, the restoring operation is performed in the same manner as the first embodiment. First, the coded data DA is read out from the file server 62 and input to the decoding means 42 through the input terminal a of switch means 47. Then, in the decoding means 42, a decoding process and an inverse quantization process, which correspond to the processing in the coding means 34, are performed, whereby the original wavelet-transformed coefficient signals Bk (i.e., unprocessed signals LLk, HLk, LHk, and HHk (where k=1 to n)) are restored.

If the wavelet-transformed coefficient signals Bk with a great number of resolution levels are sequentially restored in the aforementioned manner, the coefficient transformation means 43 performs a coefficient transformation process (image processing) on a desired coefficient signal Bk, thereby obtaining processed coefficient signals BBk. This coefficient transformation process corresponding to image processing is the same as that of the first embodiment, except that the restored wavelet-transformed coefficient signals Bk are employed. That is, in the second embodiment, as with the first embodiment, the process of suppressing a high-frequency component in a real space region, the frequency enhancement process having both the high-frequency noise suppressing effect and the artifact suppressing effect, or the gray level transformation process, can be performed in the multiresolution decoding process in which an image is restored based on the coded data DA.

Thereafter, in the inverse wavelet transformation section 44, as with the first embodiment, the processed coefficient signals BBk (processed or unprocessed signals LLn, HLk, LHk, and HHk), subjected to the aforementioned coefficient transformation process corresponding to image processing, are sequentially subjected to an inverse wavelet transformation process from the lowest-resolution level n to the original resolution level (the resolution level 0 of the HQ-image). As a result, a signal LL0 representing a restored image of the same resolution level as the HQ-image is obtained. This signal LL0 becomes a processed image signal S2 that carries the processed image subjected to the aforementioned desired image processing.

The processed image signal S2 restored in this manner is input to the output-format formation means 16 and is then reproduced and output as a visible image by the CRT monitor 71, etc. In the coefficient transformation means 43 of the restoration section 40, the coefficient transformation process corresponding to a desired image processing has already been performed. Therefore, even if an image is reproduced and output only by performing an inverse wavelet transformation process, the restored image will be a processed image obtained by performing image processing on the HQ-image.

In addition, in the restoration section 82 of the image processor 80 connected to the network 63, a processed image, obtained by performing image processing on the HQ-image, can be restored based on the transferred coded data DA in the same manner as the aforementioned description.

As described above, the second embodiment performs the coefficient transformation process (image processing) in the process of image restoration, and therefore has the following advantages and disadvantages, compared with the first embodiment which performs the coefficient transformation process (image processing) in the process of multiresolution coding. That is, the second embodiment is advantageous in that image-processing (coefficient transformation) parameters can be determined at the decoding side by changing the information K input to the coefficient transformation means 43 and is disadvantageous in that it will be a slightly longer time before an image is output, because coefficient transformation is performed at the decoding side. However, since the coefficient transformation process is relatively simple, it can be performed in a relatively shorter time, compared with the case of performing image processing in a real space region. Thus, the second embodiment is capable of providing (reproducing and outputting) a processed high-quality image at relatively high speeds in accordance with a user's needs.

While the present invention has been described with reference to the preferred embodiments thereof, the invention is not to be limited to the details given herein, but may be modified within the scope of the invention hereinafter claimed.

For example, while wavelet transformation is employed as multiresolution transformation, Laplacian pyramid transformation, Gaussian pyramid transformation, etc., may be employed.

In addition, although the grain suppression process, frequency enhancement process, and gray level transformation process have been described as examples of the image processing, other kinds of image processing may be employed. As examples of the image processing in a real space region, there are processing related primarily to image contrast (e.g., a gray level transformation process), processing dependent primarily on frequency (e.g., a grain suppression process and a frequency enhancement process), processing related to both, etc. On the other hand, a large number of multiresolution transformed signals expressed in a multiresolution space region are obtained by performing a multiresolution transformation process on an image signal expressed in a real space region. These multiresolution transformed signals can be grasped as a signal sequence which represents a group of reduced images, obtained by performing a multiresolution transformation process on the original image in accordance with each predetermined resolution level. For instance, there is a signal sequence consisting of only wavelet-transformed coefficient signals LLk (where k=1 to n) in the aforementioned embodiments, or a signal sequence obtained by taking advantage of Gaussian pyramid transformation. On the other hand, the multiresolution transformed signals can also be grasped as a sequence of band-limited image signals (subband signals, band-pass signals), obtained by splitting the original image at predetermined frequency bands. For example, there is a signal sequence consisting of wavelet-transformed coefficient signals HH1 to HHn, HL1 to HLn, LH1 to LHn, and LLn in the aforementioned embodiments, or a signal sequence obtained by utilizing Laplacian pyramid transformation. It is a matter of course that the multiresolution transformed signals may be grasped as other signal sequences. Therefore, in the case where the aforementioned coefficient transformation process corresponding to image processing in a real space region is performed on multiresolution transformed signals that can be grasped as two signal sequences, the coefficient transformation process may be performed on a desired signal of the transformed signals grasped as a signal sequence representing a reduced image group, if the coefficient transformation process is related primarily to image contrast. This is why, in the aforementioned embodiments, the coefficient transformation process corresponding to a gray level transformation process is performed on the wavelet-transformed coefficient signals LLk. On the other hand, when image processing in a real space region is dependent primarily on frequency, the coefficient transformation process corresponding to the image processing may be performed on a desired signal of the transformed signals grasped as a sequence of band-limited image signals. This is why, in the aforementioned embodiments, the coefficient transformation process, corresponding to a grain suppression process or frequency enhancement process, is performed on the coefficient signals, excluding the wavelet-transformed coefficient signals LLk, which carry a high-frequency component. When image processing in a real space region is related to both image contrast and frequency, a coefficient transformation process combining the aforementioned two coefficient transformation processes may be performed.

While, in the foregoing description, the coefficient transformation process (image processing) is performed in either the image coding process or the image decoding process, it can also be performed in both the image coding process and the image decoding process.

In the first and second embodiments, the decoding section 40 may be removed from the image coder-decoder 10. In this case, the image coding-decoding system 1 may be constructed of this image coder-decoder 10 and an image decoder 80 which has a decoding section 82 corresponding to the removed decoding section 40.

The aforementioned image coding-decoding method of the present invention may be executed by a computer. For this purpose, a program, for making a computer execute the method, may be stored in a computer readable storage medium.

What is claimed is:

1. An image coding-decoding method comprising the steps of:
   performing a multiresolution transformation process on an image signal to obtain multiresolution transformed signals;
   performing a coefficient transformation process, which corresponds to a desired image processing, on said multiresolution transformed signals to obtain processed transformed signals which carry a processed image subjected to said desired image processing;
   performing a coding process on said processed transformed signals to obtain processed coded data which carries said processed image; and
   decoding said processed coded data and further performing an inverse multiresolution transformation process, to obtain a processed image signal which carries said processed image;
   wherein said coefficient transformation process is a process of performing transform on coefficients to produce an image similar to an image which can be obtained by performing at least one of gray-scale transformation processing, noise suppression processing, frequency enhancement processing, and dynamic range compression processing.

2. The image coding-decoding method of claim 1, wherein said processed coded data is selectively inputted from either a coding means or a storage device.

3. The method of claim 1, wherein said coefficient transform comprises at least one of coefficient suppression; a non-linear transform; and gamma transform according to the desired image processing.

4. The method of claim 1, wherein the multiresolution transformed signals comprise a set of multiresolution coefficients and said coefficient transformation process changes said multiresolution coefficients.

5. The method of claim 4, wherein said coefficient transform comprises at least one of coefficient suppression; a non-linear transform; and gamma transform according to the desired image processing.

6. The method of claim 3, wherein the coefficient suppression is applied to high frequency coefficients.

7. The method of claim 3, wherein the non-linear transform comprises a gradient adjustment on high frequency coefficients.

8. The method of claim 3, wherein the gamma transform is applied to low frequency coefficients.

9. An image coding-decoding method comprising the steps of:
   performing a multiresolution transformation process on an image signal to obtain multiresolution transformed signals;
   performing a coding process on said multiresolution transformed signals to obtain coded data;
   decoding said coded data to obtain decoded transformed signals;
   performing a coefficient transformation process, which corresponds to a desired image processing, on said decoded transformed signals to obtain processed transformed signals which carry a processed image subjected to said desired image processing; and
   performing an inverse multiresolution transformation process on said processed transformed signals to obtain a processed image signal which carries said processed image;
   wherein said coefficient transformation process is a process of performing transform on coefficients to produce an image similar to an image which can be obtained by performing at least one of gray-scale transformation processing, noise suppression processing, frequency enhancement processing, and dynamic range compression processing.

10. An image coding-decoding system comprising:
    multiresolution transformation means for performing a multiresolution transformation process on an image signal to obtain multiresolution transformed signals;
    coefficient transformation means for performing a coefficient transformation process, which corresponds to a desired image processing, on said multiresolution transformed signals to obtain processed transformed signals which carry a processed image subjected to said desired image processing;
    coding means for performing a coding process on said processed transformed signals to obtain processed coded data which carries said processed image;
    decoding means for decoding said processed coded data;
    inverse multiresolution transformation means for performing an inverse multiresolution transformation process on said processed transformed signals to obtain processed image signals which carry said processed image; and
    wherein said coefficient transformation process is a process of performing transform on coefficients to produce an image similar to an image which can be obtained by performing at least one of gray-scale transformation processing, noise suppression processing, frequency enhancement processing, and dynamic range compression processing.

11. The image coding-decoding system of claim 10, further comprising a switch for selectively inputting said processed coded data from either a coding means or a storage device.

12. The image coding-decoding system of claim 11, wherein the storage device comprises a file server.

13. An image coding-decoding system comprising:
multiresolution transformation means for performing a multiresolution transformation process on an image signal to obtain multiresolution transformed signals;
coding means for performing a coding process on said multiresolution transformed signals to obtain coded data;
decoding means for decoding said coded data to obtain decoded transformed signals;
coefficient transformation means for performing a coefficient transformation process, which corresponds to a desired image processing, on said decoded transformed signals to obtain processed transformed signals which carry a processed image subjected to said desired image processing;
inverse multiresolution transformation means for performing an inverse multiresolution transformation process on said processed transformed signals to obtain processed image signals which carry said processed image; and
wherein said coefficient transformation process is a process of performing transform on coefficients to produce an image similar to an image which can be obtained by performing at least one of gray-scale transformation processing, noise suppression processing, frequency enhancement processing, and dynamic range compression processing.

14. An image coder comprising:
multiresolution transformation means for performing a multiresolution transformation process on an image signal to obtain multiresolution transformed signals;
coefficient transformation means for performing a coefficient transformation process, which corresponds to a desired image processing, on said multiresolution transformed signals to obtain processed transformed signals which carry a processed image subjected to said desired image processing; and
coding means for performing a coding process on said processed transformed signals to obtain processed coded data which carries said processed image;
wherein said coefficient transformation process is a process of performing transform on coefficients to produce an image similar to an image which can be obtained by performing at least one of gray-scale transformation processing, noise suppression processing, frequency enhancement processing, and dynamic range compression processing.

15. An image decoder comprising:
decoding means for decoding coded data to obtain decoded transformed signals;
coefficient transformation means for performing a coefficient transformation process, which corresponds to a desired image processing, on said decoded transformed signals to obtain processed transformed signals which carry a processed image subjected to said desired image processing; and inverse multiresolution transformation means for performing an inverse multiresolution transformation process on said processed transformed signals to obtain a processed image signal which carries said processed image;
wherein said coefficient transformation process is a process of performing transform on coefficients to produce an image similar to an image which can be obtained by performing at least one of gray-scale transformation processing, noise suppression processing, frequency enhancement processing, and dynamic range compression processing.

16. A computer readable storage medium recording a program for making a computer execute an image coding-decoding method, the program having:
a procedure of performing a multiresolution transformation process on an image signal to obtain multiresolution transformed signals;
a procedure of performing a coefficient transformation process, which corresponds to a desired image processing, on said multiresolution transformed signals to obtain processed transformed signals which carry a processed image subjected to said desired image processing;
a procedure of performing a coding process on said processed transformed signals to obtain processed coded data which carries said processed image; and
a procedure of decoding said processed coded data and further performing an inverse multiresolution transformation process, to obtain a processed image signal which carries said processed image;
wherein said coefficient transformation process is a process of performing transform on coefficients to produce an image similar to an image which can be obtained by performing at least one of gray-scale transformation processing, noise suppression processing, frequency enhancement processing, and dynamic range compression processing.

17. The computer readable storage medium of claim 16, wherein said program further has a procedure for selectively inputting said processed coded data from either a coding means or a storage device.

18. A computer readable storage medium recording a program for making a computer execute an image coding-decoding method, the program having:
a procedure of performing a multiresolution transformation process on an image signal to obtain multiresolution transformed signals;
a procedure of performing a coding process on said multiresolution transformed signals to obtain coded data;
a procedure of decoding said coded data to obtain decoded transformed signals;
a procedure of performing a coefficient transformation process, which corresponds to a desired image processing, on said decoded transformed signals to obtain processed transformed signals which carry a processed image subjected to said desired image processing; and
a procedure of performing an inverse multiresolution transformation process on said processed transformed signals to obtain a processed image signal which carries said processed image;
wherein said coefficient transformation process is a process of performing transform on coefficients to produce an image similar to an image which can be obtained by performing at least one of gray-scale transformation processing, noise suppression processing, frequency enhancement processing, and dynamic range compression processing.

19. A computer readable storage medium recording a program for making a computer execute an image coding-decoding method, the program having:
- a procedure of performing a multiresolution transformation process on an image signal to obtain multiresolution transformed signals;
- a procedure of performing a coefficient transformation process, which corresponds to a desired image processing, on said multiresolution transformed signals to obtain processed transformed signals which carry a processed image subjected to said desired image processing; and
- a procedure of performing a coding process on said processed transformed signals to obtain processed coded data which carries said processed image;
- wherein said coefficient transformation process is a process of performing transform on coefficients to produce an image similar to an image which can be obtained by performing at least one of gray-scale transformation processing, noise suppression processing, frequency enhancement processing, and dynamic range compression processing.

20. A computer readable storage medium recording a program for making a computer execute an image coding-decoding method, the program having:
- a procedure of decoding coded data to obtain decoded transformed signals;
- a procedure of performing a coefficient transformation process, which corresponds to a desired image processing, on said decoded transformed signals to obtain processed transformed signals which carry a processed image subjected to said desired image processing; and
- a procedure of performing an inverse multiresolution transformation process on said processed transformed signals to obtain a processed image signal which carries said processed image;
- wherein said coefficient transformation process is a process of performing transform on coefficients to produce an image similar to an image which can be obtained by performing at least one of gray-scale transformation processing, noise suppression processing, frequency enhancement processing, and dynamic range compression processing.

* * * * *